United States Patent
Jenkins

(10) Patent No.: US 6,659,499 B2
(45) Date of Patent: Dec. 9, 2003

(54) AIR BAG WITH VENT

(75) Inventor: Jeffrey A. Jenkins, Shelby Township, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 21 days.

(21) Appl. No.: 10/043,032

(22) Filed: Jan. 9, 2002

(65) Prior Publication Data

US 2003/0127839 A1 Jul. 10, 2003

(51) Int. Cl.⁷ .............................................. B60R 21/28
(52) U.S. Cl. ....................................... 280/735; 280/739
(58) Field of Search .............................. 280/739, 743.1, 280/743.2, 735

(56) References Cited

U.S. PATENT DOCUMENTS

| | | | |
|---|---|---|---|
| 3,990,726 A | * 11/1976 | Oka et al. .................... | 280/739 |
| 4,186,941 A | 2/1980 | Scholz et al. | |
| 5,333,903 A | 8/1994 | Eyrainer et al. | |
| 5,405,166 A | 4/1995 | Rogerson | |
| 5,454,595 A | 10/1995 | Olson et al. | |
| 5,603,526 A | * 2/1997 | Buchanan .................... | 280/739 |
| 6,290,257 B1 | 9/2001 | Bunce et al. | |
| 2003/0020266 A1 | * 1/2003 | Vendely et al. ............. | 280/739 |

FOREIGN PATENT DOCUMENTS

DE    3618060 A1 * 12/1987  ........... B60R/21/28

* cited by examiner

*Primary Examiner*—Peter C. English
(74) *Attorney, Agent, or Firm*—Tarolli, Sundheim, Covell & Tummino L.L.P.

(57) ABSTRACT

An inflatable device (10) has a vent (42) for enabling venting of inflation fluid. A patch (50) covers the vent (42). A release thread (70) releasably secures the patch (50) to the device to close the vent (42). A holding mechanism (82) has a first condition in response to a sensor (30) sensing a condition requiring venting of inflation fluid, and a second condition when venting is not required. The holding mechanism (82) when in the first condition holds the release thread (70) so that at least a portion of it pulls away from the patch (50) and the device (10), when the device inflates, thereby releasing the patch to open the vent (42). The holding mechanism (82) when in the second condition releases the release thread (70) for movement with the patch (50) in a direction away from the holding mechanism, when the device (10) inflates.

16 Claims, 6 Drawing Sheets

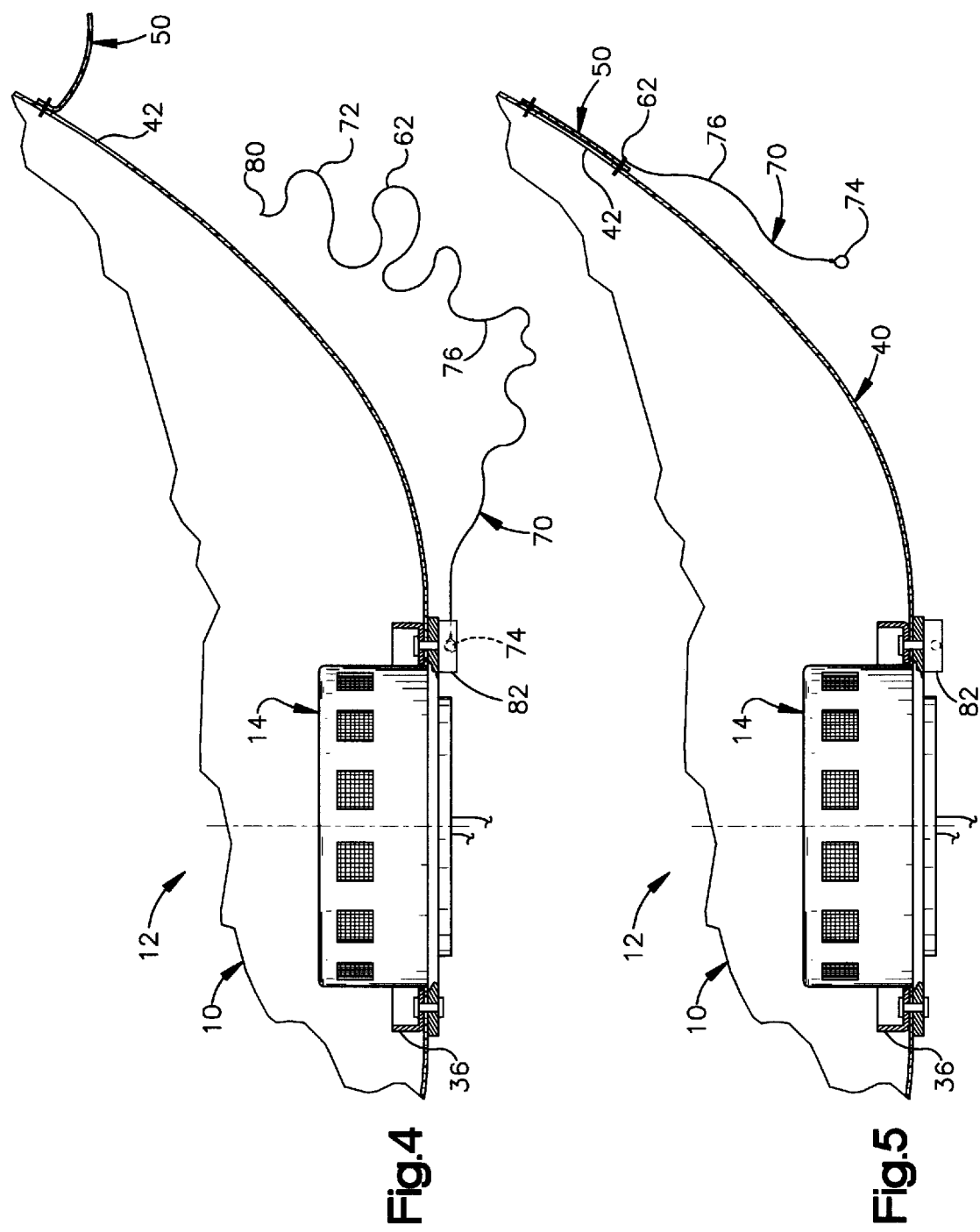

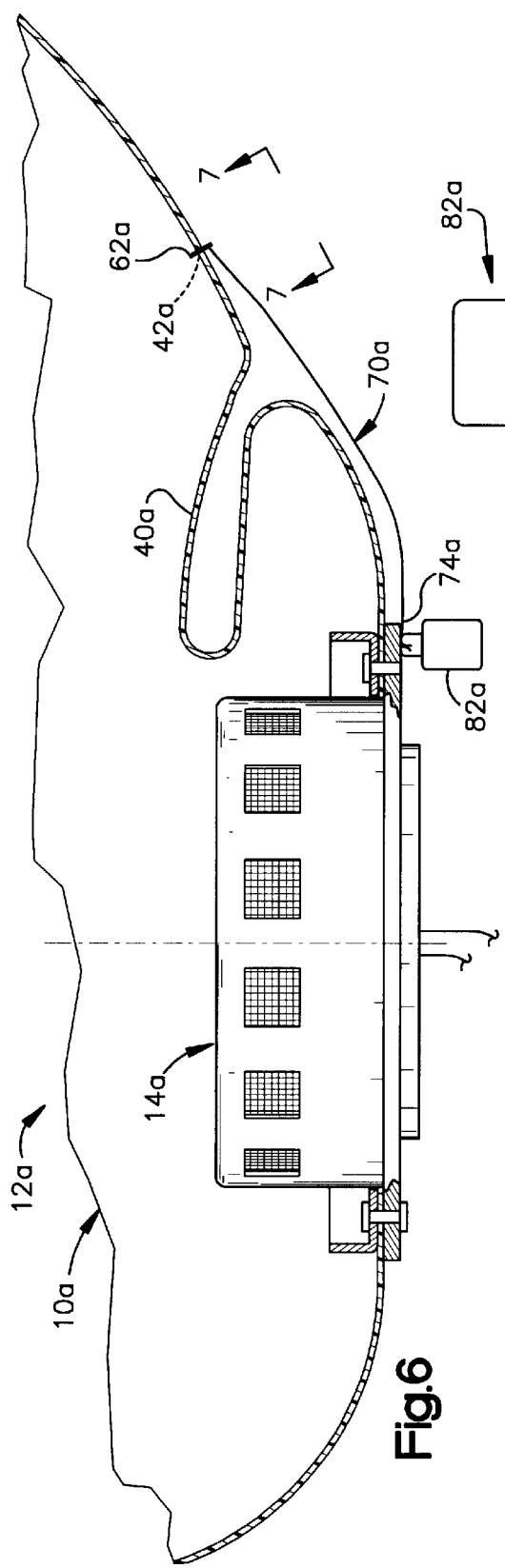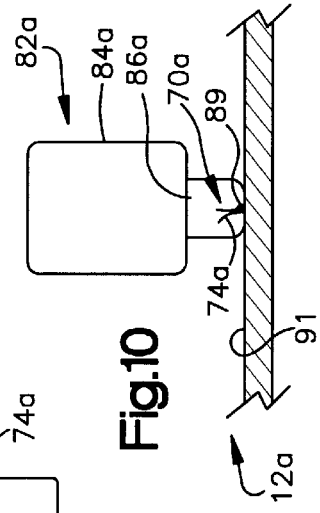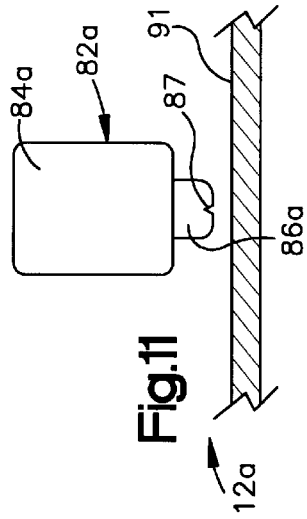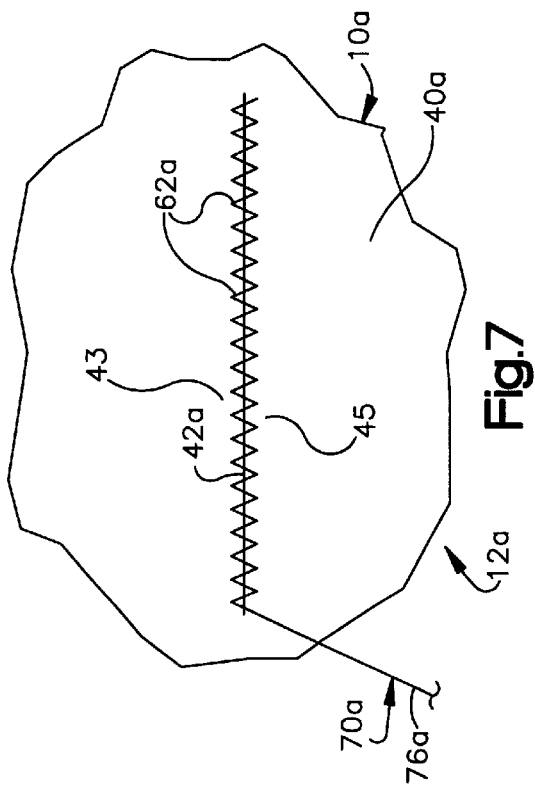

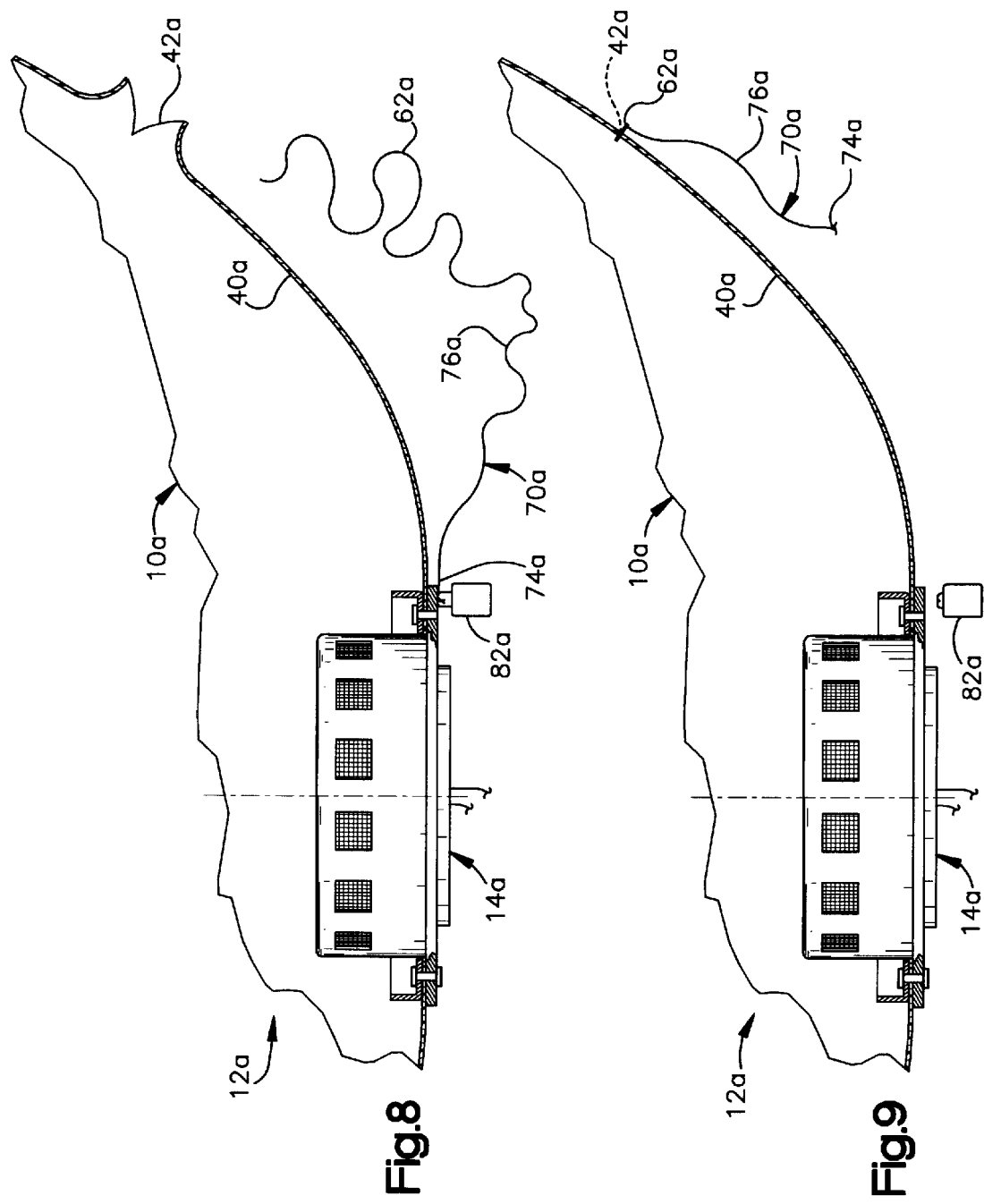

AIR BAG WITH VENT

BACKGROUND OF THE INVENTION

The present invention relates to a vehicle occupant protection apparatus. In particular, the present invention relates to an air bag having a vent that can be selectively opened to discharge inflation fluid.

DESCRIPTION OF RELATED ART

It is known to provide an air bag with a vent. The vent opens, or is uncovered, when the air bag inflates to help protect a vehicle occupant, to discharge inflation fluid from the inflated air bag. In some air bags, the vent may be selectively opened depending on sensed factors, for example, whether the occupant's seat belt is buckled. U.S. Pat. No. 6,290,257 shows one such air bag.

SUMMARY OF THE INVENTION

The present invention in one embodiment relates to a vehicle occupant protection apparatus comprising an inflatable vehicle occupant protection device having a deflated condition and an inflated condition. The device has a portion defining a vent opening for enabling flow of inflation fluid out of the device. The apparatus includes a patch for covering the vent opening to block flow of inflation fluid out of the device through the vent opening. The apparatus also includes an inflator for directing inflation fluid into the device to inflate the device from the deflated condition to the inflated condition. A release thread sewn between the patch and the device releasably secures the patch to the protection device to close the vent opening. Sensor means senses a condition requiring venting of inflation fluid from the device when the device inflates. A holding mechanism has a first condition in response to the sensor means sensing a condition requiring venting of inflation fluid from the device, and a second condition in response to the sensor means not sensing a condition requiring venting of inflation fluid from the device. The holding mechanism when in the first condition holds the release thread so that at least a portion of the release thread pulls away from the patch and the device, when the device inflates, thereby releasing the patch to open the vent opening. The holding mechanism when in the second condition releases the release thread for movement with the patch in a direction away from the holding mechanism, when the device inflates.

In another embodiment, the present invention relates to a release thread that closes the vent opening when the protection device is in the deflated condition. The apparatus includes a clamp having a first condition clamping the release thread and a second condition not clamping the release thread. A controller controls operation of the clamp to cause the clamp to take the first condition in response to the sensor means sensing a condition requiring venting of inflation fluid from the device when the device inflates. The clamp takes the second condition in response to the sensor means not sensing a condition requiring venting of inflation fluid from the device when the device inflates.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 4 is a view similar to FIG. 1 showing the protection device in an inflated condition with the vent open;

FIG. 5 is a view similar to FIG. 4 showing the protection device in an inflated condition with the vent closed;

FIG. 6 is a view similar to FIG. 1 of a portion of a vehicle occupant protection apparatus including an inflatable protection device in accordance with a second embodiment of the invention;

FIG. 7 is a schematic view of a portion of the inflatable device of FIG. 6, including a stitching section closing a vent opening, and taken generally along line 7—7 of FIG. 6;

FIG. 8 is a view similar to FIG. 6 showing the protection device in an inflated condition with the vent open;

FIG. 9 is a view similar to FIG. 6 showing the protection device in an inflated condition with the vent closed;

FIG. 10 is an enlarged schematic view of a holding mechanism that forms part of the apparatus of FIG. 6, shown in a first condition;

FIG. 11 is a view similar to FIG. 10 showing the holding mechanism in a second condition;

DETAILED DESCRIPTION OF THE INVENTION

Figure 1:
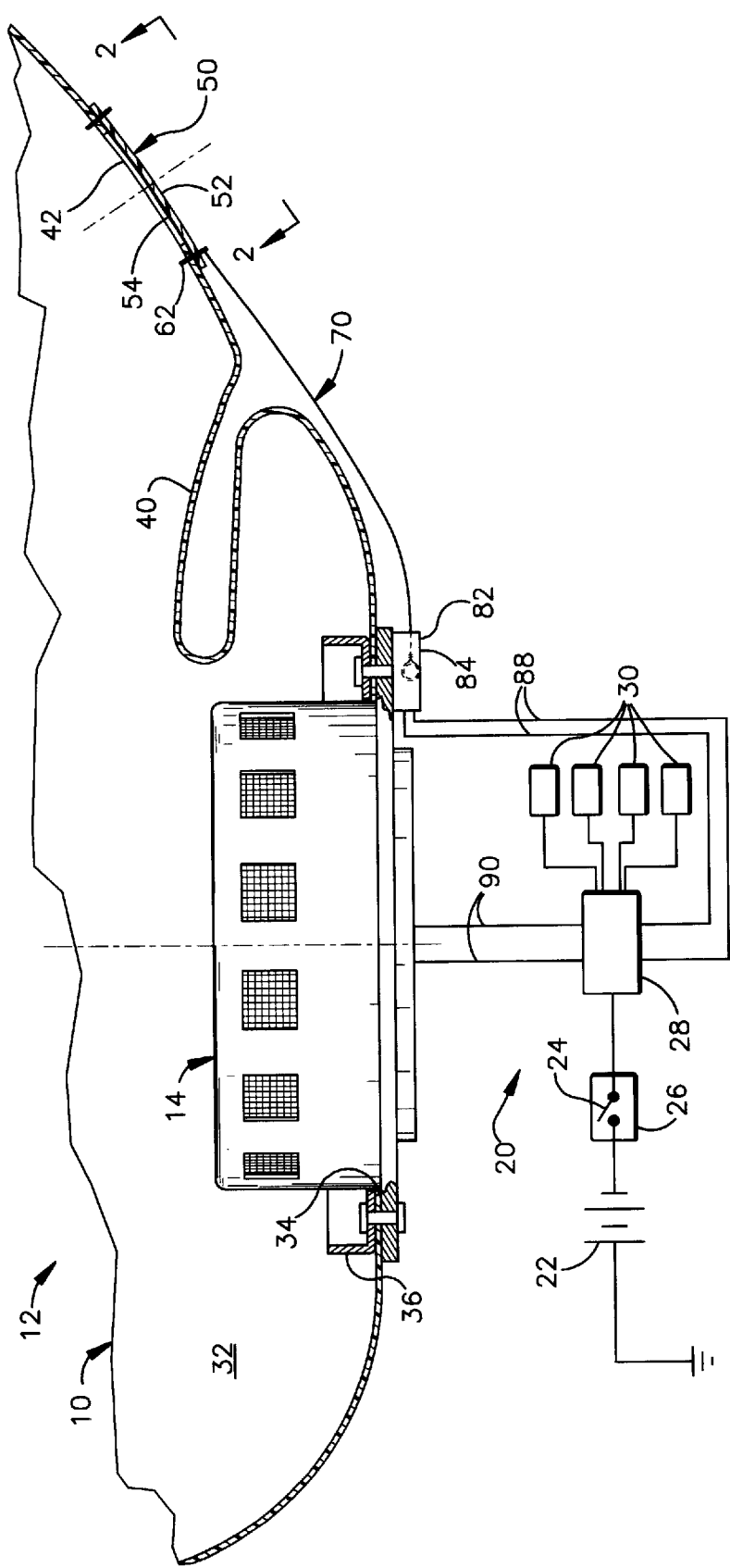
FIG. 1 is a sectional view of a portion of a vehicle occupant protection apparatus including an inflatable vehicle occupant protection device in accordance with the present invention.

The present invention relates to a vehicle occupant protection apparatus. In particular, the present invention relates to an air bag having a vent that can be selectively opened to discharge inflation fluid. As representative of the present invention, FIG. 1 illustrates a portion of an inflatable vehicle occupant protection device in the form of an air bag 10. Other inflatable vehicle occupant protection devices that can be used in accordance with the invention include, for example, inflatable seat belts, inflatable knee bolsters, inflatable head liners, inflatable side curtains, and knee bolsters operated by inflatable air bags.

The air bag 10 forms part of a vehicle occupant protection apparatus 12. The apparatus 12 includes an inflator 14 for inflating the air bag 10. The inflator 14 may contain a stored quantity of pressurized inflation fluid and an ignitable material for heating the inflation fluid. The apparatus 12 alternatively could include an inflator that uses the combustion of gas generating material to generate inflation fluid in the form of gas to inflate the air bag 10, or an inflator that contains only a stored quantity of pressurized inflation fluid for inflating the air bag.

The apparatus 10 includes vehicle electric circuitry indicated schematically at 20 (FIG. 1). The vehicle electric circuitry 20 controls the operation of the inflator 14. The vehicle electric circuitry 20 includes a power source 22, which is preferably the vehicle battery and/or a capacitor, and a normally open switch 24. The switch 24 is part of a collision sensor 26, which senses a condition indicating the occurrence of a vehicle collision. The collision-indicating condition may comprise, for example, sudden vehicle deceleration caused by a collision. The vehicle electric circuitry 20 further includes a controller, or control module, 28 for controlling the operation of the vehicle electric circuitry, and a sensor assembly 30.

The sensor assembly 30 includes one or more sensors that generate one or more control signals useful in determining whether to inflate the air bag 10 with maximum speed and force when a vehicle collision is sensed. For example, the sensor assembly 30 may include an occupant position sensor that generates a control signal indicative of the position of a vehicle occupant in the interior of a vehicle. The sensor assembly 30 may also include a buckle switch for generating a control signal indicative of a buckled or unbuckled condition of a seat buckle assembly of the vehicle. The sensor assembly 30 may also include one or more of the following: a sensor that senses the presence of a rearward-facing child seat, a weight sensor, a belt tension sensor, an occupant size sensor, a module temperature sensor, or a crash severity sensor.

The air bag 10 is preferably made from a flexible fabric material, such as woven nylon. The air bag 10 can alternatively be made from a non-woven material, such as plastic film. The air bag 10 has a generally pillow-shaped configuration when fully inflated and is designed for a driver-side application. The invention is applicable to air bags 10 that are used in other locations, for example, passenger side air bags or side impact air bags.

The air bag 10 defines an inflation fluid volume 32 for receiving inflation fluid from the inflator 14. The air bag 10 has an inflation fluid opening 34 for receiving inflation fluid from the inflator 14 to inflate the air bag 10. The air bag 10 is secured to the inflator 14 by a retainer or retaining ring shown partially at 36. The assembly of the air bag 10, retainer 36, and inflator 14 is fixed in position in the vehicle by, for example, a mounting plate (not shown).

The air bag 10 includes a panel 40. The panel 40 has a vent for discharging inflation fluid from the air bag 10. In the illustrated embodiment, the vent is an opening 42 (FIG. 2) in the panel 40 having a circular configuration centered on a point 44. The vent 42 is defined by a portion 46 of the panel 40 that extends around and encloses the vent.

The vent 42 is covered by a patch 50. The patch 50 is a piece of material that is secured to the panel 40 of the air bag 10, in a manner described below, and that blocks flow of inflation fluid out of the air bag through the vent 42. The patch 50 may be made from the same material as the other parts of the air bag 10, or may be made from a different material. In the illustrated embodiment, the patch 50 is a circular piece of fabric material larger in diameter than the vent 42. The patch 50 has first and second opposite major side surfaces 52 and 54 (FIG. 1).

The air bag 10 includes two stitching sections 60 and 62 (FIG. 2) that together secure the patch 50 to the panel 40. The stitching section 60 is a permanent stitching section that permanently secures one edge portion 64 of the patch 50 to the panel 40. The stitching section 62 is a releasable stitching section that releasably secures another edge portion 66 of the patch 50 to the panel 40 when the air bag 10 is uninflated and, in some cases, when it is inflated.

The permanent stitching section 60 (FIG. 2) extends through the edge portion 64 of the patch 50 and through the panel 40 of the air bag 10. The permanent stitching section 60 extends around the vent 42 in an arcuate configuration centered on the center point 44. The permanent stitching section 60 in the illustrated embodiment has an arcuate extent as indicated by the arrow α of just under ninety degrees.

The releasable stitching section 62 extends through the edge portion 66 of the patch 50 and through the panel 40 of the air bag 10. The releasable stitching section 62 extends around the vent 42 in an arcuate configuration centered on the center point 44. The releasable stitching section 62 in the illustrated embodiment has an arcuate extent as indicated by the arrow β of just under two hundred seventy degrees.

The releasable stitching section 62 is formed by a release thread 70. The release thread 70 is a filament, a group of filaments twisted together, or a filamentous length formed by spinning and twisting short textile fibers into a continuous strand. The thread 70 may be a fine continuous strand made by plying two or more of these filament groups or lengths with a tight twist and smooth finish. The thread 70 may be made of various materials, such as natural fabric, a plastic (for example, nylon), or another material suitable for sewing. The thread 70 may be the same as, or similar to, the material that is used to sew together various panels of the air bag. The thread 70 used to form the releasable stitching section 62 may be the same as, or similar to, the thread that is used to form the permanent stitching section 60.

Figure 2:
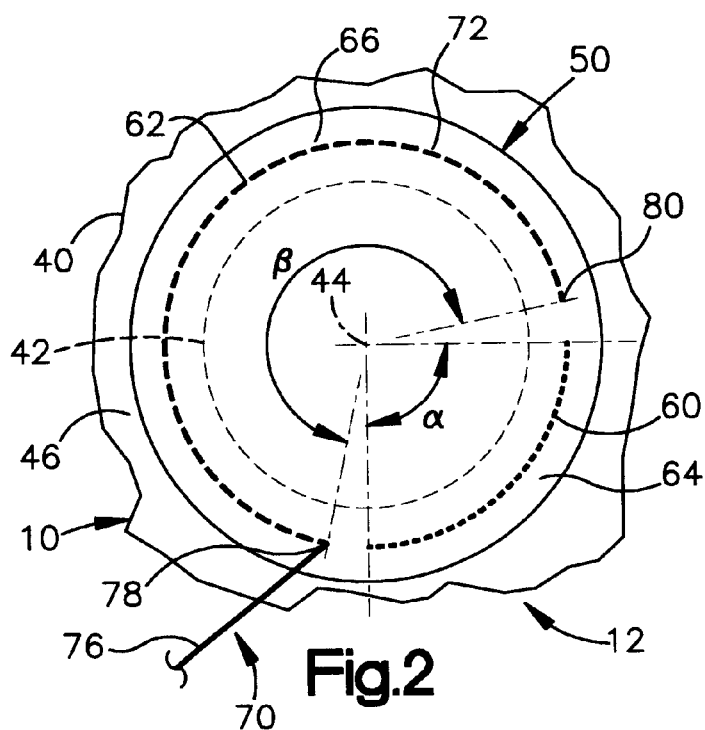
FIG. 2 is a schematic view of a portion of the inflatable device of FIG. 1, including a patch covering a vent opening, and taken generally along line 2—2 of FIG. 1.
Figure 3:
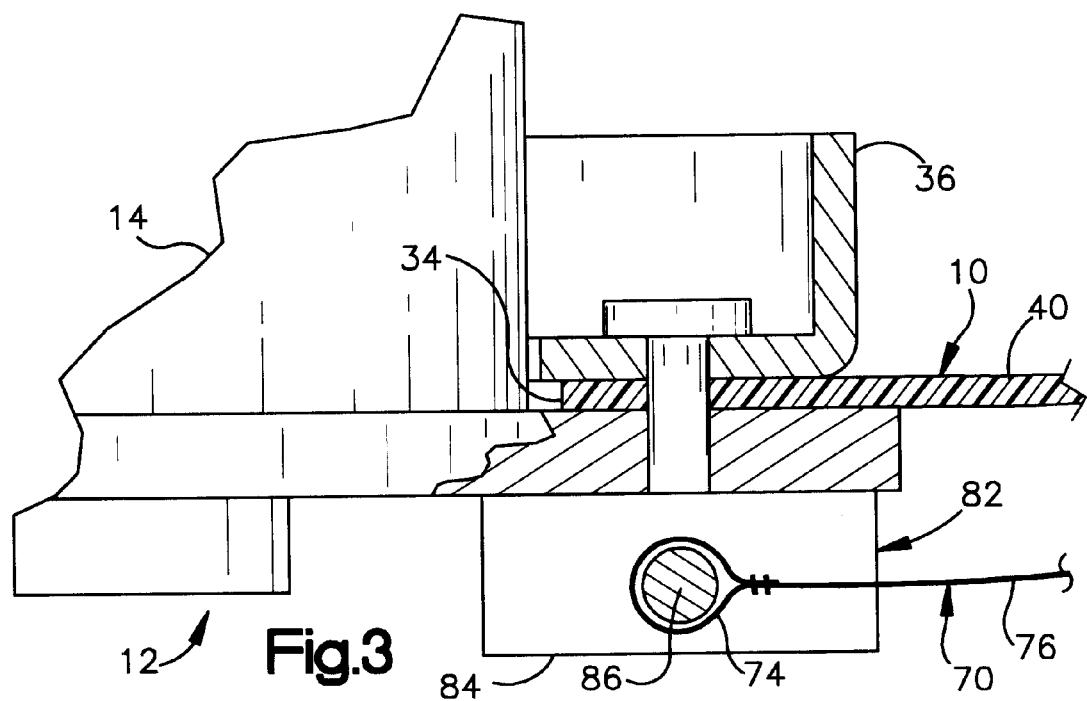
FIG. 3 is an enlarged view of a holding mechanism that forms part of the apparatus of FIG. 1.

The thread 70 shown in FIGS. 1 and 2 is a single continuous length of material having a first portion 72 that forms the releasable stitching section 62, a second portion 74 (FIG. 3) that forms an opposite end of the thread, and an intermediate or pulling portion 76.

The releasable stitching section 62 has opposite ends 78 and 80. The releasable stitching section 62 is spaced apart, at its ends 78 and 80, from the permanent stitching section 60.

The intermediate portion 76 of the thread 70 extends from one end 78 of the releasable stitching section 62. The intermediate portion 76 extends to the end portion 74 of the thread 70 located adjacent a fixed portion of the vehicle occupant protection apparatus 12, that is, a portion that does not move when the air bag 10 is inflated. The end portion 74 of the thread 70 is formed as a loop.

The apparatus includes a holding mechanism 82 located adjacent the inflator 14, for holding the end portion 74 of the thread 70. The holding mechanism 82 is fixed in position relative to the inflator 14, and is thus a fixed portion of the apparatus 12. The holding mechanism 82 includes a solenoid 84 having a movable pin or part 86. The looped end portion 74 of the thread 70 extends around the pin 86 of the solenoid 84. The solenoid 84 is electrically actuatable over lead wires 88 (FIG. 1). The lead wires 88 are connected with the controller 28 of the vehicle electric circuitry 20. Upon actuation of the solenoid 84, the pin 86 is movable in a direction into and out of the plane of the paper, as viewed in FIG. 3.

If a collision-indicating condition sensed by the collision sensor 26 indicates the occurrence of a collision for which inflation of the air bag 10 may be desired to help protect the occupant of the vehicle, the switch 24 in the collision sensor 26 closes. The controller 28 determines, on the basis of inputs from the sensor assembly 30, whether the air bag 10 should be inflated and, if so, whether the vent 42 should be opened.

If the air bag 10 is to be inflated, the controller 28 transmits an actuation signal to the inflator 14 over lead wires 90. When the inflator 14 is actuated, it emits a large volume of inflation fluid into the inflation fluid volume 32 of the air bag 10.

If the vent 42 is not to be opened, the solenoid 84 is actuated with a signal over the lead wires 88. The actuation of the solenoid 84 causes the pin 86 to be moved to a position in which it no longer holds the end portion 74 of the thread 70 against movement away from the holding mechanism 82 and the inflator 14.

As the air bag 10 inflates thereafter, the patch 50 and the portion of the panel 40 surrounding the vent opening 42 move away from the holding mechanism 82. The force of movement of the patch 50 is transmitted into the thread 70, pulling the thread away from the holding mechanism 82. Because the end portion 74 of the thread 70 is not held by the pin 86, the entire thread 70 moves away from the holding mechanism 82, with the patch 50 and the inflating air bag 10. Because the thread 70 moves with the patch 50, there is no force placed on the thread that would cause it to tear out of, or be released from, the panel 40 and the patch. Therefore, the patch 50 remains secured to the panel 40 by both the permanent stitching section 60 and the releasable stitching section 62. The vent 42 remains covered, or closed.

If, on the other hand, the controller 28 determines that the vent 42 should be opened, the solenoid 84 is not actuated. The solenoid pin 86 remains in a position inside the looped end portion 74 of the thread 70, holding the end portion of the thread against movement away from the holding mechanism 82 and the inflator 14.

As the air bag 10 inflates thereafter, the patch 50 and the portion of the panel 40 surrounding the vent opening 42 move away from the holding mechanism 82. The force of movement of the patch 50 is transmitted into the thread 70, pulling the thread away from the holding mechanism 82. Because the end portion 74 of the thread 70 is held by the pin 86, the thread becomes taut. The tensile force on the thread 70 increases to a level at which the thread is caused to tear out of, or be released from, the panel 40 and the patch 50. Specifically, the releasable stitching section 62 is pulled out of the air bag 10, releasing the edge portion 66 of the patch 50 for movement away from the panel 40. The vent 42 in the panel 40 is uncovered or opened. The vent 42 opens to an open condition to permit flow of pressurized fluid from the air bag 10 through the vent.

Because the releasable stitching section 62 is spaced apart, at its ends 78 and 80, from the permanent stitching section 60, the releasing of the thread 70 does not affect the permanent stitching section. As a result, the permanent stitching section 60 does not rupture or tear out of the panel 40. The permanent stitching section 60 acts as a tether to keep the patch 50 on the panel 40, while inflation fluid is venting from the air bag 10. It should be understood that an air bag in accordance with the present invention may include a patch 50 that comes off the air bag panel 40 completely. Thus, the permanent section stitching 60 may not be needed, and the patch 50 may be secured to the panel 40 by only a releasable stitching section 62.

FIGS. 6–11 illustrate a vehicle occupant protection apparatus 12a in accordance with a second embodiment of the present invention. The apparatus 12a is similar in many respects to the apparatus 12 (FIGS. 1–5). Parts of the apparatus 12a (FIGS. 6–11) that are the same as or similar to parts of the apparatus 12 are given the same reference numerals with the suffix "a" attached.

In the apparatus 12a, the vent opening 42a in the air bag 10a is formed differently. In addition, the holding mechanism 82a is different in the apparatus 12a than in the apparatus 12.

Specifically, in the apparatus 12a, the air bag 10a includes a vent opening 42a that is formed as a cut or slit in the panel 40a. The cut 42a is a linear cut that extends between two adjacent portions 43 and 45 of the panel 40a. In another embodiment, the cut 42a could have a different configuration.

The opening 42a is closed with a portion 62a of a thread 70a. The thread portion 62a is a releasable stitching section that extends for substantially the entire length of the opening 42a, so that the flow of inflation fluid through the opening is blocked. An intermediate portion 76a of the thread 70a extends from the stitching section 62a, to the holding mechanism 82a. There is no permanent stitching section holding the vent opening 42a closed.

An end portion 74a of the thread 70a is clamped in the holding mechanism 82a. The holding mechanism 82a comprises a solenoid shown schematically at 84a. The solenoid 84a has a pin or other movable part 86a with a groove 87. Received in the groove 87 is the end portion 74a of the thread 70a. The end portion 74a has a knot 89. The knot 89 engages the pin 86a to block movement of the thread end portion 74a through the groove 87. The pin 86a is adjacent a clamping surface 91.

The pin 86a of the solenoid 84a is movable between a first condition shown in FIG. 10 and a second condition shown in FIG. 11. Movement of the pin 86a is controlled in the same manner as in the first embodiment. Thus, the position of the pin 86a, holding or releasing the thread 70a, is set by the vehicle electric circuitry 20. When the solenoid 84a is in the first condition shown in FIG. 10, the engagement of the pin 86a with the clamping surface 91 blocks movement of the end portion 74a of the thread 70a through the groove 87 in the pin. Thus, the thread 70a can not be pulled from the holding mechanism 82a. When the solenoid 84a is in the second condition shown in FIG. 11, the pin 86a is moved away from the clamping surface 91. The end portion 74a of the thread 70a is released from the holding mechanism 82a.

If the air bag 10a is to be vented when inflated, the air bag is inflated while the solenoid 84a is in the first condition (FIGS. 8 and 10). As the air bag 10a inflates, the portion of the panel 40a surrounding the vent opening 42a moves away from the holding mechanism 82a. The force of movement of the panel 40a is transmitted into the thread 70a, pulling it away from the holding mechanism 82a. Because the end portion 74a of the thread 70a is held by the pin 86a, the thread becomes taut. The tensile force on the thread 70a increases to a level at which the thread is caused to tear out of, or be released from, the panel 40a. Specifically, the releasable stitching section 62a is pulled out of the air bag 10a. The vent 42a in the panel 40a is uncovered or opened. The vent 42a opens to an open condition to permit flow of pressurized fluid from the air bag 40a through the vent.

If the bag 10a is not to be vented when inflated, the air bag is inflated while the solenoid 84a is in the second condition (FIGS. 9 and 11). As the air bag 10a inflates, the portion of the panel 40a surrounding the vent opening 42a moves away from the holding mechanism 82a. The force of movement of the panel 40a is transmitted into the thread 70a, pulling the thread away from the holding mechanism 82a. Because the end portion 74a of the thread 70a is released from the holding mechanism 82a, the thread does not become taut. The stitching section 62a is not torn out of, or pulled out of, the panel 40a of the air bag 10a. The vent 42a in the panel 40a remains in the closed condition shown in FIG. 7.

Figure 12:
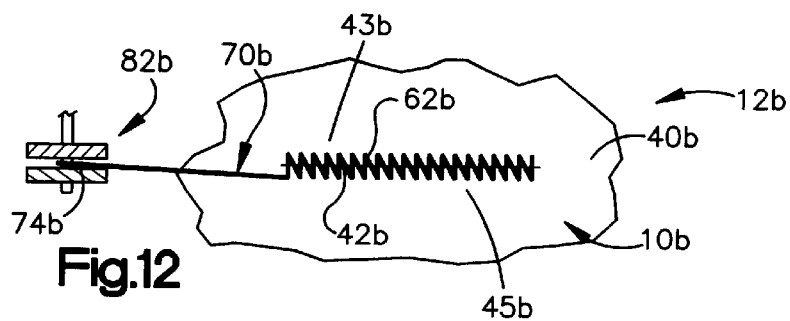
FIG. 12 is a view similar to FIG. 7 of a portion of an inflatable protection device in accordance with a third embodiment of the invention, showing a vent in a closed condition.
Figure 13:
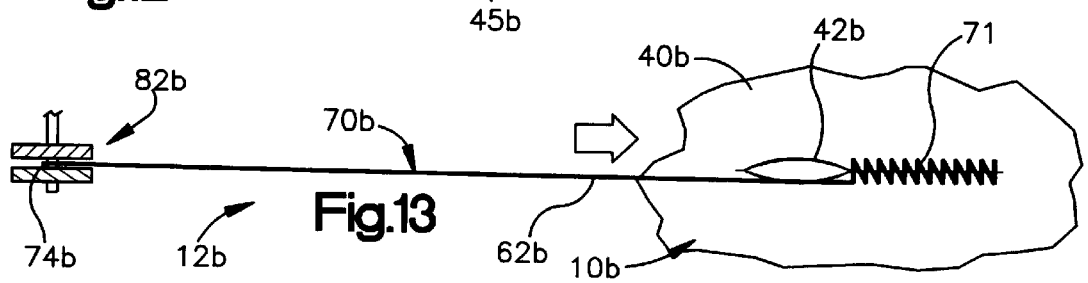
FIG. 13 is a view similar to FIG. 12 showing the vent in an open condition.

FIGS. 12–13 illustrate a portion of a vehicle occupant protection apparatus 12b in accordance with a third embodiment of the present invention. In the apparatus 12b, a vent opening 42b in a panel 40b of an air bag 10b is formed as a cut or slit in the bag between two adjacent panel portions 43b and 45b. The vent opening 42b is sewn shut with a releasable stitching section 62b. The releasable stitching section 62b is part of a thread 70b that extends from the panel 40b to a holding mechanism or clamp shown schematically at 82b.

If the air bag 10b is to be vented when inflated, the air bag is inflated while the thread 70b is held from movement away from the holding mechanism 82b. As the air bag 10b inflates, the portion of the panel 40b surrounding the vent opening 42b moves away from the holding mechanism 82b. The force of movement of the panel 40b is transmitted into the thread 70b, pulling the thread away from the holding mechanism 82b. Because the end portion 74b of the thread 70b is held by the holding mechanism 82b, the thread becomes taut. The tensile force on the thread 70b increases to a level at which the portion 62b of the thread is caused to tear out of, or be released from, the panel 40b. The thread 70b, however, is long enough so that not all of it pulls out of or releases from the panel 40b. Specifically, an end portion 71 of the thread 70b remains attached to the air bag panel 40b, as shown in FIG. 13, when the vent 42b in the panel is opened.

Figure 14:
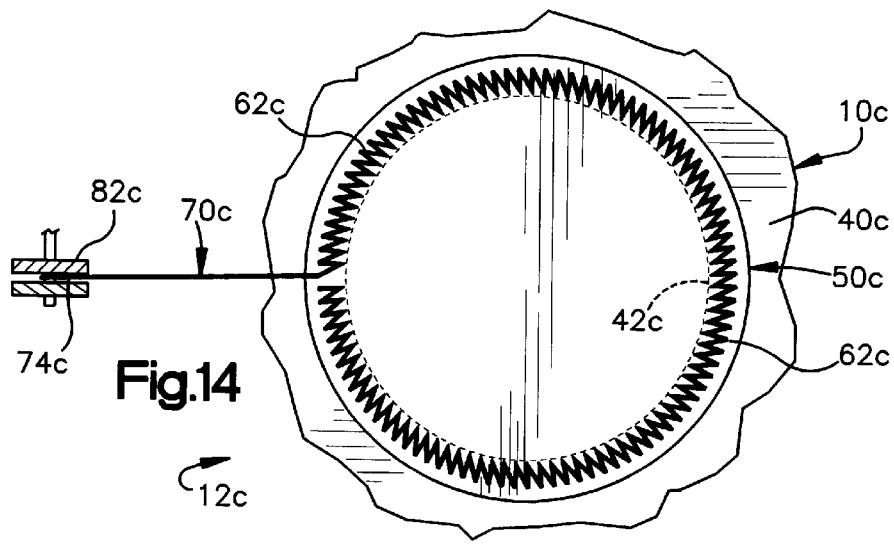
FIG. 14 is a view similar to FIG. 12 of a portion of an inflatable protection device in accordance with a fourth embodiment of the invention, showing a vent in a closed condition.
Figure 15:
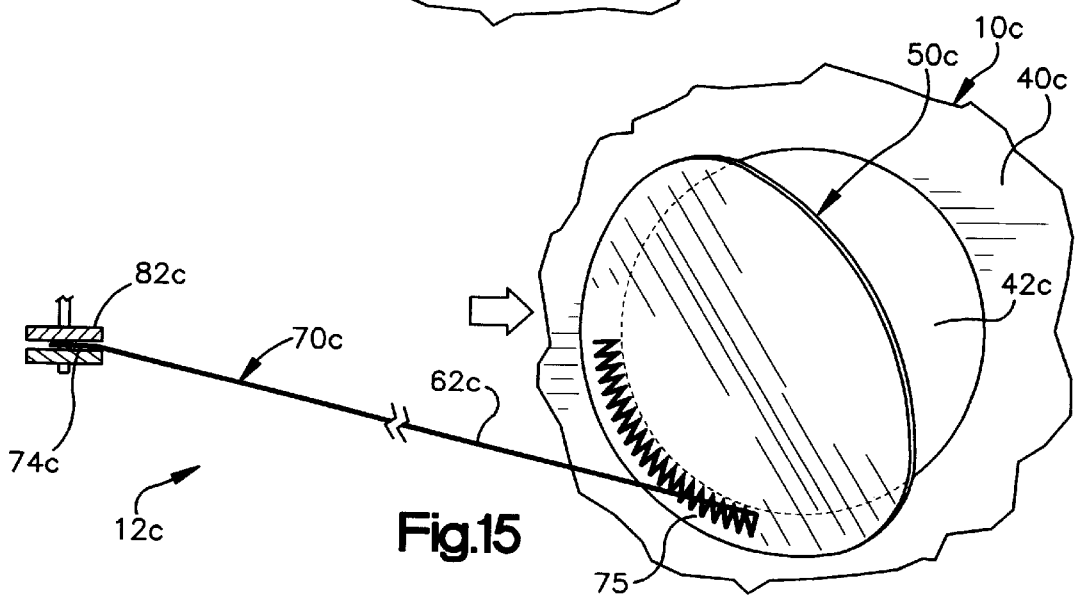
FIG. 15 is a view similar to FIG. 14 showing the vent in an open condition.

FIGS. 14–15 illustrate a portion of a vehicle occupant protection apparatus 12c in accordance with a fourth embodiment of the present invention. The apparatus 12c is similar in many respects to the apparatus 12 (FIGS. 1–5). Parts of the apparatus 12c that are the same or similar to parts of the apparatus 12 are given the same reference numerals with the suffix "c" attached.

In the apparatus 12c, the patch 50c of the air bag 10c is secured to the panel 40c of the air bag solely by a releasable stitching section 62c. The releasable stitching section 62c extends substantially completely around the outer periphery of the patch 50c, thus closing the vent opening 42c. The releasable stitching section 62c is part of a thread 70c that extends from the panel 40c to a holding mechanism or clamp shown schematically at 82c.

If the air bag 10c is to be vented when inflated, the air bag is inflated while the thread 70c is held from movement away from the holding mechanism 82c. As the air bag 10c inflates, the portion of the panel 40c surrounding the vent opening 42c moves away from the holding mechanism 82c. The force of movement of the panel 40c is transmitted into the thread 70c, pulling the thread away from the holding mechanism 82c. Because the end portion 74c of the thread 70c is held by the holding mechanism 82c, the thread becomes taut. The tensile force on the thread 70c increases to a level at which the portion 62c of the thread is caused to tear out of, or be released from, the panel 40c and the patch 50c. The thread 70c, however, is long enough so that not all of it pulls out of or releases from the panel 40c. Specifically, an end portion 75 of the thread 70c remains attached to the patch 50c and to the air bag panel 40c, as shown in FIG. 15, when the vent 42c in the panel is opened. The end portion 75 maintains the patch 50c connected with the panel 40c, even when the vent 42c is opened. This prevents the patch 50c from coming completely off the panel 40c.

From the above description of the invention, those skilled in the art will perceive improvements, changes and modifications in the invention. Such improvements, changes and modifications within the skill of the art are intended to be covered by the appended claims.

Having described the invention, I claim:

1. A vehicle occupant protection apparatus comprising:
   an inflatable vehicle occupant protection device having a deflated condition and an inflated condition, said device having a portion defining a vent opening for enabling flow of inflation fluid out of said device;
   a patch for covering said vent opening to block flow of inflation fluid out of said device through said vent opening;
   an inflator for directing inflation fluid into said device to inflate said device from the deflated condition to the inflated condition;
   a release thread that is sewn between said patch and said device and that releasably secures said patch to said protection device to close said vent opening;
   sensor means for sensing a condition requiring venting of inflation fluid from said device when said device inflates; and
   a holding mechanism having a first condition in response to said sensor means sensing a condition requiring venting of inflation fluid from said device and having a second condition in response to said sensor means not sensing a condition requiring venting of inflation fluid from said device;
   said holding mechanism when in the first condition holding said release thread so that at least a portion of said release thread pulls away from said patch and said device when said device inflates thereby releasing said patch to open said vent opening;
   said holding mechanism when in the second condition releasing said release thread for movement with said patch in a direction away from said holding mechanism when said device inflates.

2. Apparatus as set forth in claim 1 wherein said patch remains sewn to said device when said portion of said release thread pulls away from said patch and said device when said device inflates.

3. Apparatus as set forth in claim 1 wherein said thread is not held by said holding mechanism but is spaced apart from said holding mechanism when said inflatable vehicle occupant protection device is inflated and said holding mechanism is in the second condition.

4. Apparatus as set forth in claim 3 wherein said release thread does not rupture when said patch is released from said device.

5. Apparatus as set forth in claim 1 wherein said release thread does not rupture when said patch is released from said device.

6. Apparatus as set forth in claim 1 wherein said release thread pulls completely away from said patch and said device when said device inflates.

7. Apparatus as set forth in claim 6 wherein said patch remains sewn to said device when said device inflates.

8. Apparatus as set forth in claim 1 wherein said release thread remains partially connected with said patch and said device when said device is inflated and said holding mechanism is in the first condition.

9. A vehicle occupant protection apparatus comprising:
   an inflatable vehicle occupant protection device having a deflated condition and an inflated condition, said protection device having a portion defining a vent opening for enabling flow of inflation fluid out of said protection device;

an inflator for directing inflation fluid into said inflatable device to inflate said protection device from the deflated condition to the inflated condition;

a release thread closing said vent opening when said protection device is in the deflated condition;

a clamp having a first condition clamping said release thread and a second condition not clamping said release thread;

sensor means for sensing a condition requiring venting of inflation fluid from said device when said device inflates; and a controller for controlling operation of said clamp to cause said clamp to take said first condition in response to said sensor means sensing a condition requiring venting of inflation fluid from said device when said device inflates and to cause said clamp to take said second condition in response to said sensor means not sensing a condition requiring venting of inflation fluid from said device when said device inflates, wherein said release thread remains partially connected with said device when said device is inflated and said clamp is in the first condition.

10. Apparatus as set forth in claim 9 wherein said clamp comprises a member movable between a first position clamping a end portion of said thread against a clamping surface and a second position spaced apart from said clamping surface to release said end portion of said thread for movement away from said clamp.

11. A vehicle occupant protection apparatus comprising:

an inflatable vehicle occupant protection device having a deflated condition and an inflated condition, said protection device having a portion defining a vent opening for enabling flow of inflation fluid out of said protection device;

an inflator for directing inflation fluid into said inflatable device to inflate said protection device from the deflated condition to the inflated condition;

a release thread closing said vent opening when said protection device is in the deflated condition;

a clamp having a first condition clamping said release thread and a second condition not clamping said release thread;

sensor means for sensing a condition requiring venting of inflation fluid from said device when said device inflates; and a controller for controlling operation of said clamp to cause said clamp to take said first condition in response to said sensor means sensing a condition requiring venting of inflation fluid from said device when said device inflates and to cause said clamp to take said second condition in response to said sensor means not sensing a condition requiring venting of inflation fluid from said device when said device inflates, wherein said vent opening is a slit in said device that is sewn shut by a releasable stitching section of said release thread, and wherein said release thread remains partially connected with said device when said device is inflated and said clamp is in the first condition.

12. A vehicle occupant protection apparatus comprising:

an inflatable vehicle occupant protection device having a deflated condition and an inflated condition, said protection device having a portion defining a vent opening for enabling flow of inflation fluid out of said protection device;

an inflator for directing inflation fluid into said inflatable device to inflate said protection device from the deflated condition to the inflated condition;

a release thread closing said vent opening when said protection device is in the deflated condition;

a clamp having a first condition clamping said release thread and a second condition not clamping said release thread;

sensor means for sensing a condition requiring venting of inflation fluid from said device when said device inflates; and a controller for controlling operation of said clamp to cause said clamp to take said first condition in response to said sensor means sensing a condition requiring venting of inflation fluid from said device when said device inflates and to cause said clamp to take said second condition in response to said sensor means not sensing a condition requiring venting of inflation fluid from said device when said device inflates, wherein said clamp comprises a member movable between a first position clamping an end portion of said thread against a clamping surface and a second position spaced apart from said clamping surface to release said end portion of said thread for movement away from said clamp.

13. Apparatus as set forth in claim 12 wherein said vent opening is a slit in said device that is sewn shut by a releasable stitching section of said release thread.

14. Apparatus as set forth in claim 12 wherein said release thread is released completely from said device when said device is inflated and said clamp is in the first condition.

15. A vehicle occupant protection apparatus comprising:

an inflatable vehicle occupant protection device having a deflated condition and an inflated condition, said device having a portion defining a vent opening for enabling flow of inflation fluid out of said device;

a patch for covering said vent opening to block flow of inflation fluid out of said device through said vent opening;

an inflator for directing inflation fluid into said device to inflate said device from the deflated condition to the inflated condition;

a release thread that is sewn between said patch and said device and that releasably secures said patch to said protection device to close said vent opening;

sensor means for sensing a condition requiring venting of inflation fluid from said device when said device inflates; and a mechanism having a first condition in response to said sensor means sensing a condition requiring venting of inflation fluid from said device and having a second condition in response to said sensor means not sensing a condition requiring venting of inflation fluid from said device;

said mechanism when in the first condition holding said release thread so that at least a portion of said release thread pulls away from said patch and said device when said device inflates thereby releasing said patch to open said vent opening;

said mechanism when in the second condition releasing said release thread for movement with said patch in a direction away from said mechanism when said device inflates.

16. A vehicle occupant protection apparatus comprising:

an inflatable vehicle occupant protection device having a deflated condition and an inflated condition, said protection device having a portion defining a vent opening for enabling flow of inflation fluid out of said protection device;

an inflator for directing inflation fluid into said inflatable device to inflate said protection device from the deflated condition to the inflated condition;

a release thread having a portion closing said vent opening when said protection device is in the deflated condition, said release thread having an end portion with a knot;

a mechanism comprising portions defining a through passage, said mechanism having a first condition in which said portions defining said through passage block movement of said knot through said through passage and said mechanism having a second condition releasing said knot for movement away from said mechanism;

sensor means for sensing a condition requiring venting of inflation fluid from said device when said device inflates; and a controller for controlling operation of said mechanism to cause said mechanism to take said first condition in response to said sensor means sensing a condition requiring venting of inflation fluid from said device when said device inflates and to cause said mechanism to take said second condition in response to said sensor means not sensing a condition requiring venting of inflation fluid from said device when said device inflates.

* * * * *